No. 752,700. PATENTED FEB. 23, 1904.
M. M. NICHOLLS.
TUBING.
APPLICATION FILED JULY 7, 1903.
NO MODEL.
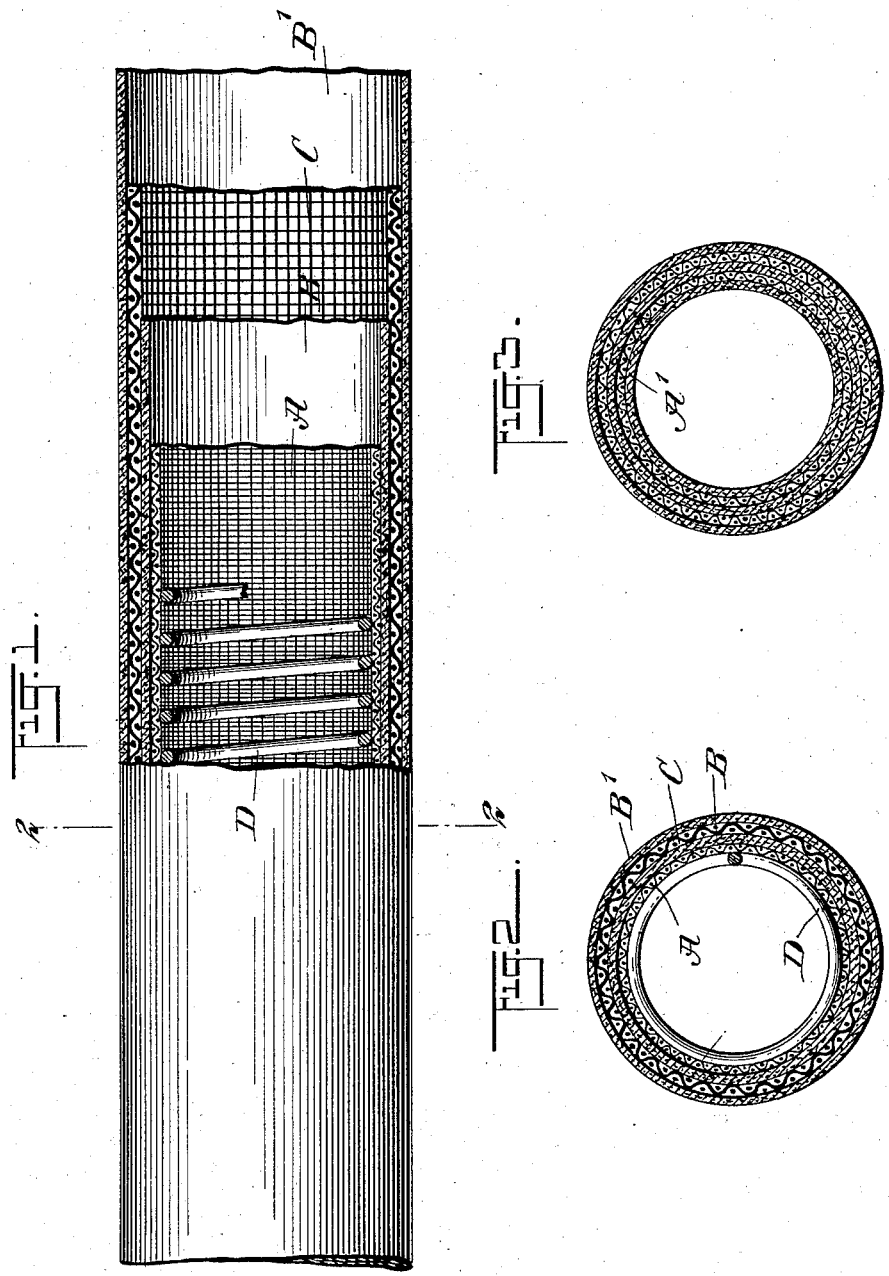
WITNESSES:
INVENTOR
Mark M. Nicholls
BY
Briesen & Knauth
ATTORNEYS No. 752,700. Patented February 23, 1904.

UNITED STATES PATENT OFFICE.

MARK M. NICHOLLS, OF NEW YORK, N. Y.

TUBING.

SPECIFICATION forming part of Letters Patent No. 752,700, dated February 23, 1904.

Application filed July 7, 1903. Serial No. 164,565. (No model.)

*To all whom it may concern:*

Be it known that I, MARK M. NICHOLLS, a citizen of the United States, and a resident of the borough of Manhattan, city, county, and State of New York, have invented certain new and useful Improvements in Tubing, of which the following is a specification.

My invention relates to tubing for the conveyance of gases and liquids, and has for its object to provide a tubing of permanent gastight or liquid-tight qualities. To this end I construct tubing in the novel manner hereinafter described and claimed.

Reference is to be had to the accompanying drawings, in which—

Figure 1 is partly an elevation and partly a longitudinal section of one form of my invention. Fig. 2 is a cross-section on line 2 2 of Fig. 1, and Fig. 3 is a cross-section of another form of my invention.

In the construction illustrated by Figs. 1 and 2 the tubing comprises an inner layer of close-mesh fabric A, practically impervious to the glue composition B, which is applied to the outer surface of said fabric. Then follows a layer of an open-mesh fabric C, and on the outside of this is applied another layer of glue composition B' or other material impervious to the fluid to be conveyed through the tubing. On the outside may be placed a suitable covering, and the tubing may be armored, if desired, in any customary or approved manner, as by means of a coil D.

As the fabric C has open meshes, the glue composition or other impervious material will pass into the meshes, so that the fabric C will practically be embedded in the said impervious material. I thus prevent said material from cracking when the tubing is bent, and the danger of leakage is avoided.

In certain cases, as when the tubing is to serve for the conveyance of acids or of liquids which might be absorbed by the inner layer of fabric A, I employ an open-mesh inner layer A', as shown in Fig. 3, so that the impervious substance B will spread on and cover the inner surface of said fabric. In all other respects the construction shown in Fig. 3 may be the same as that first described.

Various modifications may be made without departing from the nature of my invention.

I claim—

1. Tubing comprising an inner layer of fabric, a layer of impervious material surrounding said fabric, an open-mesh fabric surrounding said impervious material and another layer of impervious material surrounding said open-mesh fabric and entering the meshes thereof.

2. Tubing comprising an inner layer of fabric, a surrounding layer of impervious material, and a layer of open-mesh fabric embedded in said impervious material.

3. Tubing comprising an inner layer of fabric, a layer of impervious material surrounding said fabric and a layer of open-mesh fabric in engagement with said impervious material and having its meshes filled with said material.

4. Tubing comprising an inner layer of close-mesh fabric, a layer of impervious material surrounding said close-mesh fabric and another layer of impervious material surrounding said open-mesh fabric, said two layers of impervious material uniting through the interstices of said open-mesh fabric.

In testimony whereof I have signed my name to this specification in the presence of two subscribing witnesses.

MARK M. NICHOLLS.

Witnesses:
HANS V. BRIESEN,
EUGENE EBLE.